United States Patent
Damron et al.

(10) Patent No.: US 6,918,111 B1
(45) Date of Patent: Jul. 12, 2005

(54) SYSTEM AND METHOD FOR SCHEDULING INSTRUCTIONS TO MAXIMIZE OUTSTANDING PREFETCHES AND LOADS

(75) Inventors: Peter C. Damron, Fremont, CA (US); Nicolai Kosche, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 841 days.

(21) Appl. No.: 09/679,434

(22) Filed: Oct. 3, 2000

(51) Int. Cl.[7] .................................................. G06F 9/45
(52) U.S. Cl. .................... 717/161; 712/200; 712/202; 717/151
(58) Field of Search ............................... 717/150–161; 712/200–207, 232–241

(56) References Cited

U.S. PATENT DOCUMENTS

| | | | | |
|---|---|---|---|---|
| 5,202,975 A | * | 4/1993 | Rasbold et al. ............. 717/151 |
| 5,377,336 A | * | 12/1994 | Eickemeyer et al. ........ 712/207 |
| 5,493,675 A | | 2/1996 | Faiman, Jr. et al. ........ 717/151 |
| 5,627,982 A | | 5/1997 | Hirata et al. ............... 712/206 |
| 5,768,594 A | * | 6/1998 | Blelloch et al. ............ 717/149 |
| 5,881,315 A | * | 3/1999 | Cohen ......................... 710/52 |
| 5,901,147 A | * | 5/1999 | Joffe ........................... 370/412 |
| 5,941,983 A | * | 8/1999 | Gupta et al. ................ 712/214 |

* cited by examiner

*Primary Examiner*—Anil Khatri
*Assistant Examiner*—Lawrence Shrader

(57) ABSTRACT

The present invention discloses a method and device for ordering memory operation instructions in an optimizing compiler. for a processor that can potentially enter a stall state if a memory queue is full. The method uses a dependency graph coupled with one or more memory queues. The dependency graph is used to show the dependency relationships between instructions in a program being compiled. After creating the dependency graph, the ready nodes are identified. Dependency graph nodes that correspond to memory operations may have the effect of adding an element to the memory queue or removing one or more elements from the memory queue. The ideal situation is to keep the memory queue as full as possible without exceeding the maximum desirable number of elements, by scheduling memory operations to maximize the parallelism of memory operations while avoiding stalls on the target processor.

18 Claims, 6 Drawing Sheets

MEMORY INSTRUCTION SCHEDULING METHOD

PRIOR ART CACHE

TYPICAL COMPILER

FIGURE 3: Directed Acyclic Graphs According To The Present Invention

FIGURE 4
SYSTEM WITH COMPILER ACCORDING TO THE CURRENT INVNETION
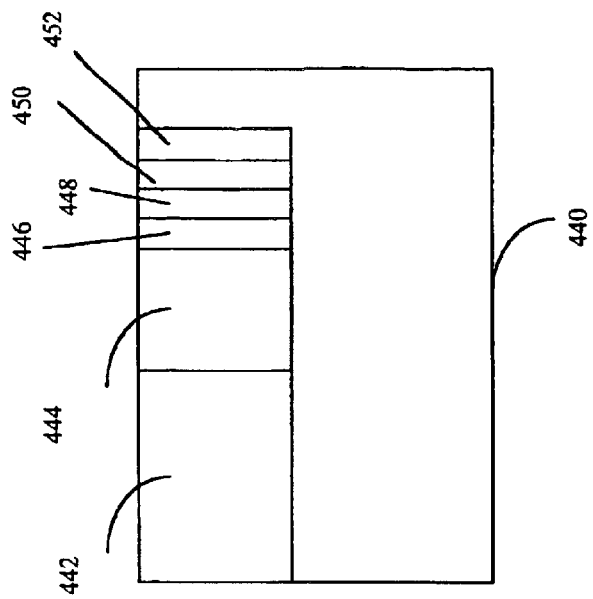
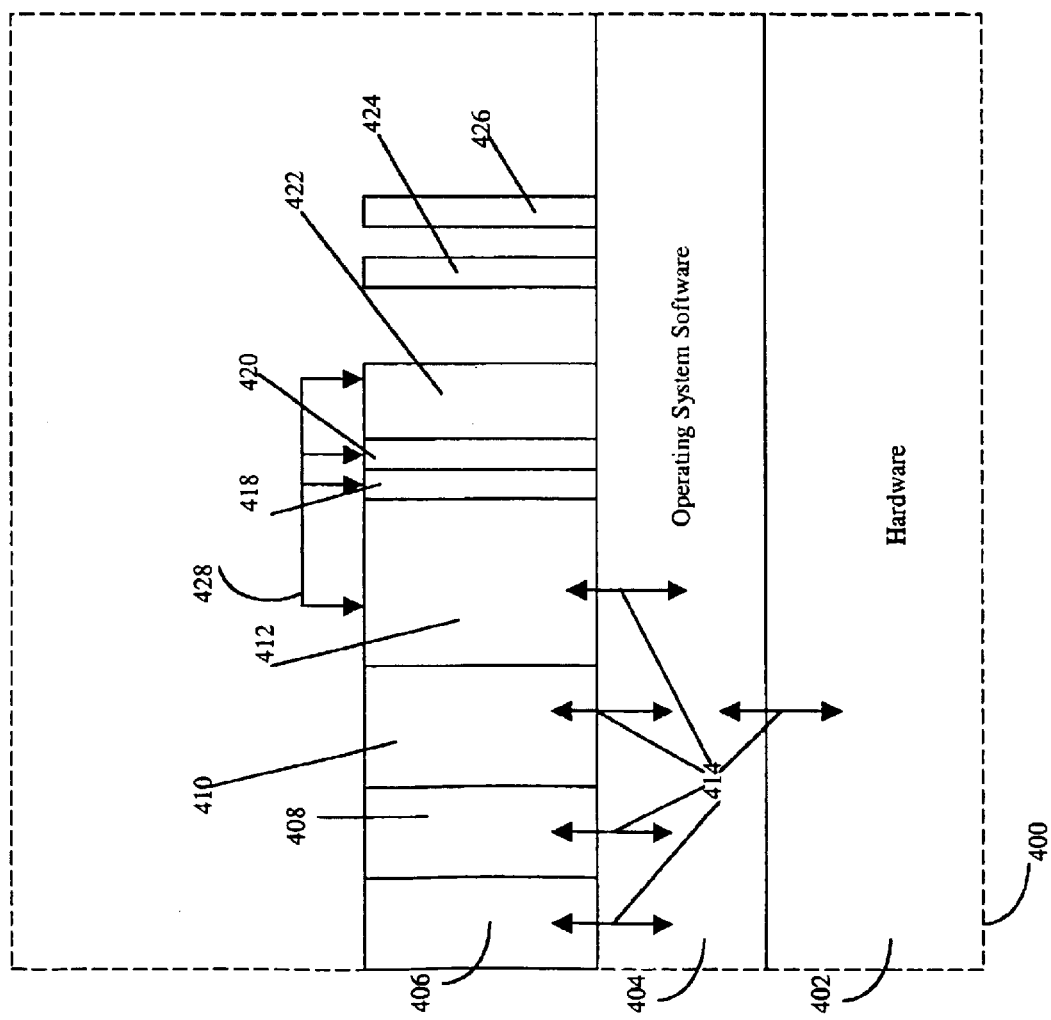

COMPILER ACCORDING TO THE PRESENT INVENTION

MEMORY INSTRUCTION SCHEDULING METHOD

SYSTEM AND METHOD FOR SCHEDULING INSTRUCTIONS TO MAXIMIZE OUTSTANDING PREFETCHES AND LOADS

RELATED APPLICATIONS

The present patent application is related to U.S. Pat. No. 6,678,796, filed Oct. 3, 2000 and entitled "System and Method for Scheduling Memory Instructions to Provide Adequate Prefetch Latency," U.S. Pat. No. 6,574,713, filed Oct. 10, 2000 and entitled "Heuristic for Identifying Loads Guaranteed to Hit in Processor Cache" and U.S. Pat. No. 6,651,245, filed Oct. 3. 2000 and entitled "System and Method for Insertion of Prefetch Instructions by a Compiler." These patents have been assigned to the same assignee and are incorporated herein by reference.

BACKGROUND OF THE INVENTION

1. Field of the Invention

This invention pertains generally to software compilers. More particularly this invention is directed to a system and method for the scheduling of prefetch and memory loading instructions by a compiler during compilation of software programs to maximize the efficiency of the code.

2. The Prior Art

Current computer systems include, among other things, a memory system and a processing unit (or processor or central processing unit (CPU)). A memory system serves as a repository of information, while the CPU accesses information from the memory system, operates on it, and stores it back.

It is well known that CPU clock speeds are increasing at a faster rate than memory speeds. This creates a time gap, typically measured in clock cycles of the CPU, between the request for information in memory to when the information is available inside the CPU. If a CPU is executing instructions in a linear manner, when a currently executing instruction needs to read a memory location from the memory system, the request is "very urgent". The processor must wait, or stalls, while the memory system provides the data requested to the CPU. The number of CPU clock cycles between the clock cycle when the memory request was made to the cycle where the data is available to the instruction that needed it in the CPU is called the latency of the memory.

Caches are used to help alleviate the latency problem when reading from main memory. A cache is specially configured, high-speed, expensive memory in addition to the conventional memory (or main memory). FIG. 1 depicts a conventional hierarchical memory system, where a CPU is operatively coupled to a cache, and the cache is operatively coupled to the main memory. By placing the cache (small, relatively fast, expensive memory) between main memory (large, relatively slow memory) and the CPU, the memory system as a whole system is able to satisfy a substantial number of requests from the CPU at the speed of the cache, thereby reducing the overall latency of the system.

When the data requested by the CPU is in the cache (known as a "hit"), the request is satisfied at the speed of the cache. However, when the data requested by the CPU is not in the cache (known as a "miss"), the CPU must wait until the data is provided from the slower main memory to the cache and then to the CPU, resulting in greater latency. As is well known in the art, the frequency of cache misses is much higher in some applications when compared to others. In particular, commercial systems employing databases (as most servers do) miss cache with much greater frequency than many systems running scientific or engineering applications.

To help address the problem of latency and to increase the hit to miss ratio associated with cache memory, many computer systems have included instructions for prefetching data from memory to cache. For example, instructions set architectures (ISA's), such as SPARC™ V9, support software data prefetch operations. The instruction's use, however, is left entirely to the program executing in the CPU. It may not be used at all, or it may be used with little or no intelligence, adding little in the way added performance. Because the level of knowledge needed about the CPU and its memory is extremely detailed in order to effectively use prefetch instructions, their use is generally left to compilers. For compilers to effectively use prefetch instructions, effective algorithms are needed which can be implemented by the compiler writers.

The algorithms needed for scientific and engineering applications is not as complex as for many commercial systems. This is due to the fact that scientific and engineering applications tend to work on arrays that generally reside in contiguous memory locations. Thus, predicting which memory addresses will be required for the executing instruction stream is both relatively easy to predict and can be predicted in time to address latency concerns. In applications with regular memory reference patterns there will plenty of time to allow for the latency between the issuing of the memory prefetch instruction, and the time when an executing instruction needs the contents of that memory location.

For database applications and other commercial applications, however, predicting which areas of memory will be required is much more difficult. Because of the nature of the programs, there can be and often is a need for the contents of memory locations that are not contiguous. In addition to the non-contiguous memory locations, the compiled programs rarely leave enough time between instructions that will create a cache-miss and any associated prefetch instruction which may have alleviated the cache-miss otherwise. This means that there is often insufficient latency time (in CPU cycles) between the address forming operation and the memory operation (associated with the address) to cover the prefetch latency. In these cases, there is no readily discernable way of establishing when a prefetch instruction should be issued to minimize latency.

Accordingly, there is a need for a method and apparatus which can schedule memory prefetch instructions such that the number of times adequate latency for the prefetch instruction is provided can be maximized. The present invention satisfies this need and other deficiencies found in the background art.

BRIEF DESCRIPTION OF THE INVENTION

In an optimizing compiler, a new method and device for scheduling memory operations is disclosed. The present invention minimizes processor stalls due to the latency of loads or prefetches by scheduling memory operations to keep the target processors' memory fetch queue as full as possible. For applications that experience large numbers of cache misses, scheduling for memory queues has proven to be more important than scheduling for the CPU pipeline itself.

The compiler includes a module for creating a directed acyclic graph (DAG) showing the dependencies of operations found in the code being compiled. The compiler has a module that traverses the graph. Traversing the graph identifies nodes without dependencies on previous operations, which correspond to nodes having no incoming dependency edges. A node with no incoming dependencies corresponds to an instruction that is ready to execute. The group of nodes having no incoming dependency lines originating from other nodes form a set of nodes called ready nodes. Any one of this set could be scheduled to run next if no consideration is given to the need to keep the processors' in-flight memory queue as full as possible.

The set of ready nodes is compared to a model of the contents of a memory queue (or queues) kept by the compiler. If the queue has less than a designated optimal number of elements or entries, then a node corresponding to an instruction that adds to the queue is chosen. If the queue is already at the maximal number, then a memory operation that will remove an element from the queue is chosen. Generally, loads, prefetches and stores add to the queue while operations that require that a previous value obtained from memory be available empty the queue. If there is no optimal choice, any memory operation is chosen.

Once the choice has been made, a set of operations occur. The graph is updated by removing the chosen node along with any dependency edges that originated from it. The chosen node no longer belongs to the ready set, and the corresponding instruction is inserted in the code stream. The queue is updated accordingly (the corresponding element is added or some elements removed).

Once the updates have finished, the graph traversal module traverses the new graph and identifies a new set of ready nodes. Again, the best choice between the ready nodes is made using the heuristic keeping the queue or queues full. This process repeats until traversing the graph yields no ready nodes. This corresponds to having no more instructions to schedule, and the algorithm is finished.

BRIEF DESCRIPTION OF THE DRAWING FIGURES

FIG. 4 is a block diagram of system running the present invention.

DETAILED DESCRIPTION OF PREFERRED EMBODIMENTS

Person of ordinary skill in the art will realize that the following description of the present invention is illustrative only and not in any way limiting. Other embodiments of the invention will readily suggest themselves to such skilled persons having the benefit of this disclosure.

Figure 1:
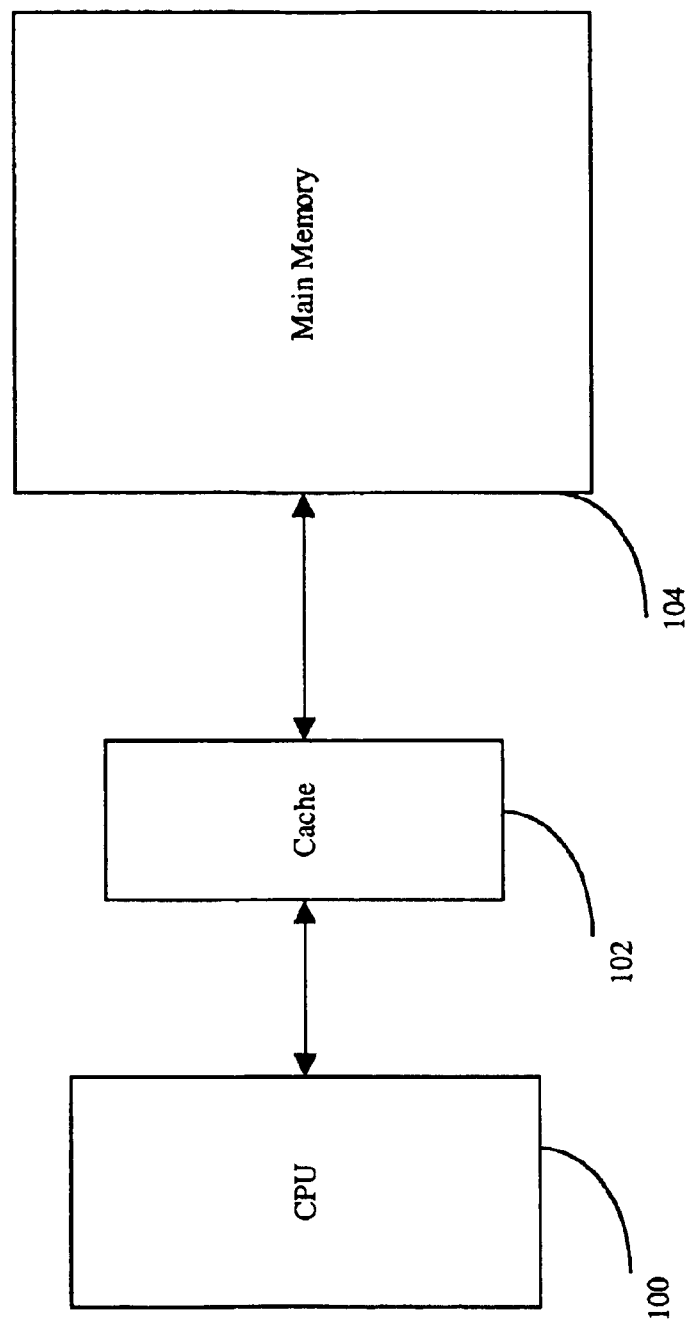
FIG. 1 is a block diagram of prior art CPU-cache-memory.
Figure 2:
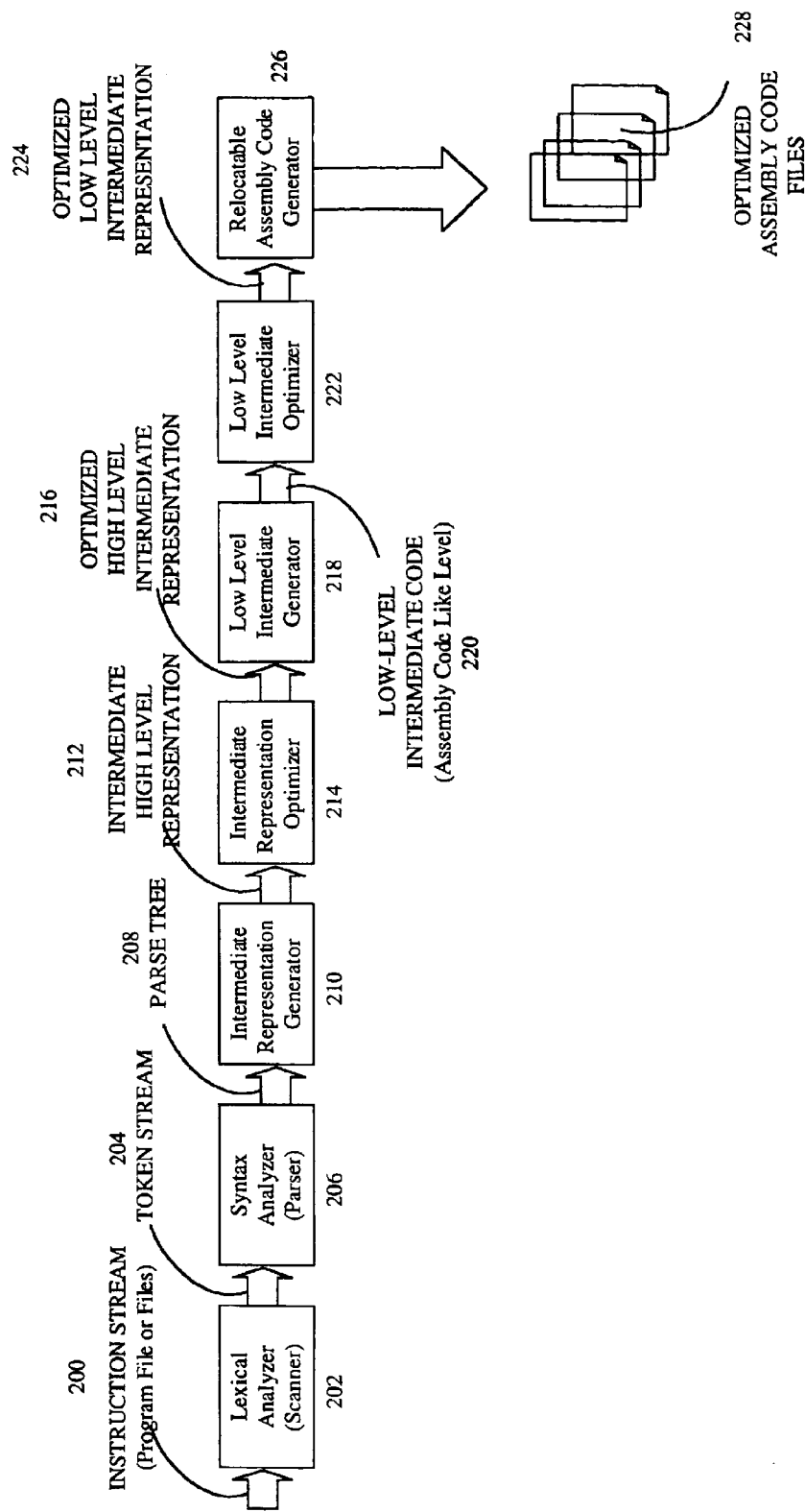
FIG. 2 is a block diagram of conventional compiler processing.

FIG. 2 shows the stages involved in a typical compiler. The stages will be mentioned briefly here in order to provide context for the present invention. For more detailed descriptions of these steps any of the standard books on the design and construction of software (not silicon) compilers can be used to supplement this description. An example of a standard book on the subject is "Compilers: Principles, Techniques, and Tools" by Aho, Sethi, and Ullman.

The input to a compiler is the program to be compiled. This may constitute anything from a part of a small single file containing a few instructions (or lines of code) to a large number of files contain thousands and thousands of instructions (or lines of code). From the compiler's viewpoint, this is instruction stream 200.

The initial step is identify the basic operational components of the instruction stream, the tokens. This is done in the scanner, 202. The output of the scanner is a token stream 204. All the elements of the token stream are recognized ("legal") tokens of the language being parsed. Token stream 204 is fed into parser 206. Parser 206 analyzes the syntax of the token stream. If the program was syntactically correct, parser 206 creates as output a parse tree 208, which contains all the tokens in token stream 204. The parse tree 208 is used by intermediate representation generator 210 to generate the program in an high-level intermediate representation 212. The intermediate representation is then passed to intermediate representation optimizer 214. Intermediate representation optimizer 214 optimizes the program in ways suitable for this high level, such as doing a global intraprocedural analysis of the program's control and data flows. As is well known in the art, optimizations are carried out using more than one type of optimizing algorithm. Typically the compiler designers will include as many as they think they need to achieve their design goals.

The output from intermediate representation optimizer 214 is an optimized high level intermediate representation of the program, 216. This is then given to low level intermediate representation generator 218. Low level intermediate representation generator 218 generates lines of code 220 that are very close to, or are, assembly language statements for the target processor. This code stream 220 is then fed to low level intermediate optimizer 222. Low level intermediate optimizer 222 carries out optimizations appropriate for that level of code, such as software pipelining optimizations, procedure optimizations, register optimizations, and instruction scheduling. As with the high level optimizers, the compiler designers will include as many optimizing steps and algorithms as they think they need to achieve their design goals. The output, 224, is an optimized version of low level intermediate representation 220. This is fed to relocatable assembly code generator 226, which generates relocatable assembly code located in one of more files, 228.

Some compilers and compiler designers don't use two levels of intermediate representations. Although it can be argued the difference is more semantic than content-based, in such cases 218 generates a version of assembly code, 222 optimizes the assembly code, and 226 creates relocatable assembly code or relocatable object code files as output. The invention in the present disclosure will work equally well in either case.

The present invention is a new optimization method and system for optimizing in the low level intermediate representation, or assembly code level, optimizer, 222. It is intended to be embodied in a compiler for use with any processor or processor family that may benefit from the disclosed optimization. One such family of processors is the UltraSPARC family, in particular the UltraSPARC III, from Sun Microsystems, Inc.

As is well known in the art dependency graphs, and in particular directed acyclic graphs (DAGs), are commonly used to map or graph dependencies between instructions. Dependency graphs have been used in the past to help optimize instruction scheduling for processor pipelines, or processors with multiple execution units.

The present invention came about through experimental confirmation that graphs preserving dependencies, and in particular DAGs, could be successfully used as part of a solution to optimize instruction scheduling for memory operation instructions or memory operations. This is a new use, application, and method involving dependency graphs such as DAGs. For any section of code at the assembly (or low-level intermediate) level, a DAG may be created showing the dependencies between memory operations. An example is given below. The example is in pseudo-code, where registers are indicated by the prefix "r" followed by a number—r6 is register 6, square brackets indicate the "contents at address"—[r3] means the contents when r3 is used as an address, a non-memop has three arguments including the two operands and a target register—"add r1, r2, r3" means add r1 and r2 and place the result in r3, and the line numbers are indicated by "Ln" where n is an integer.

| L1 | ld | [r9], r5 |
| L2 | ld | [r5], r7 |
| L3 | pref | [r1] |
| L4 | add | r5, r1, r3 |
| L5 | pref | [r3] |
| L6 | ld | [r1], r2 |

Figure 3:
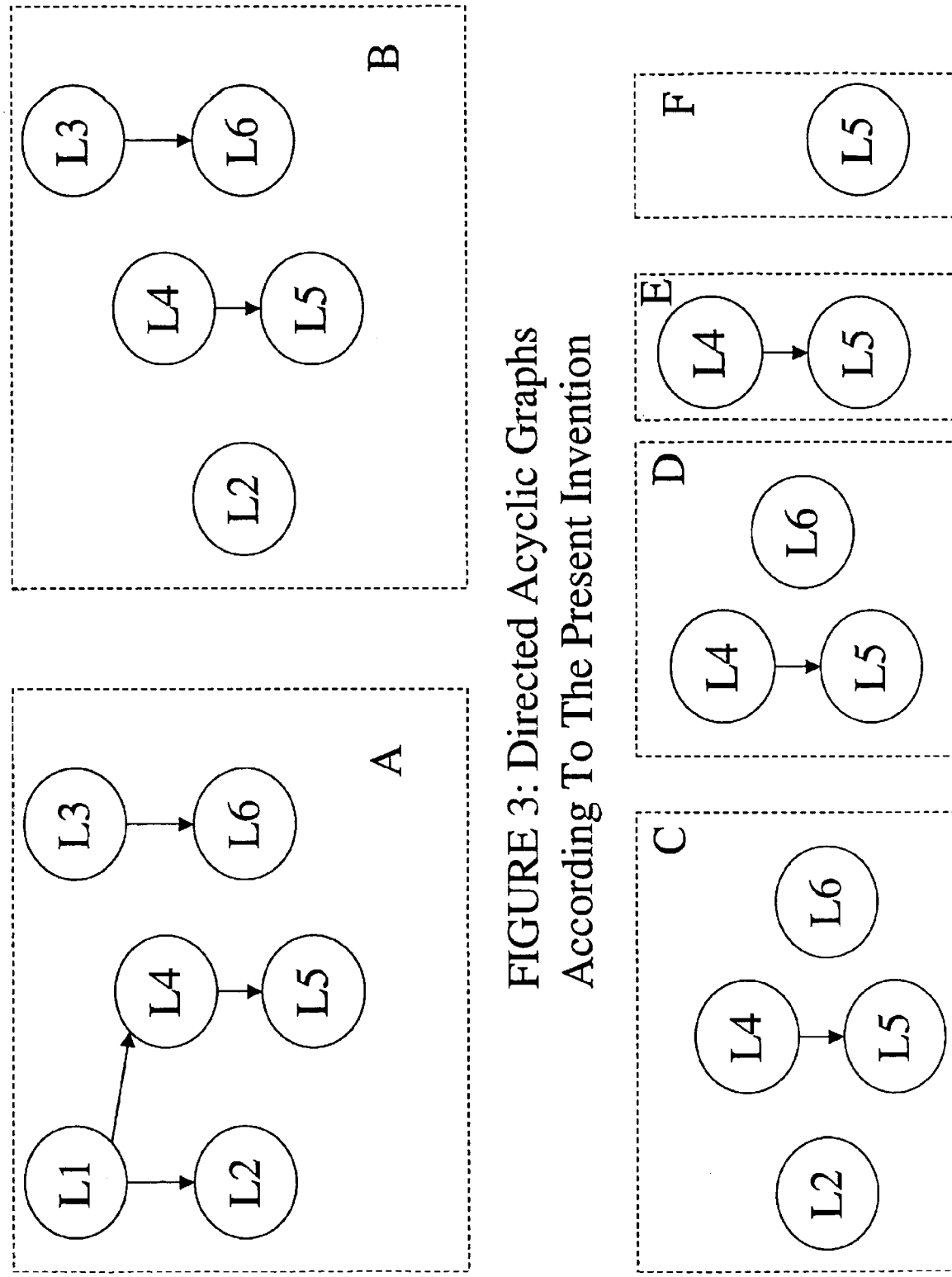
FIG. 3 is a set of diagrams showing directed acyclic graphs.

A DAG corresponding to the above lines of code is shown in FIG. 3A. The boxes enclose one DAG, and the circles are labeled L1 through L6, corresponding the lines of code in the above code segment. In FIG. 3A, all six lines of code are shown. Line L1 has no dependencies, so has no incoming edges. Line L2 depends on L1 (where register r5 is loaded from memory), so has a dependency edge going from L1 to L2. Continuing on by looking at each instruction, the final DAG is shown in 3A. Any node with an incoming edge is dependent on another instruction; only those nodes with no incoming edges are ready to execute. In this case that means nodes L1 and L3 are equally ready to execute.

Looking at lines L1 and L3, it is readily seen this is true. Either could be executed first. A completely arbitrary choice is made to execute L1 first. As soon as that choice is made, the node with L1 in it is removed from the graph, as well as any dependency edges originating from it (after L1 executes there will no longer be anything depending on it to finish— the results are available). The resulting graph is shown in FIG. 3B. The instructions that are ready to execute in the new graph correspond to L2, L3 and L4. A quick check of the actual lines of code will show this is correct. Again making an arbitrary choice between the two, L3 will be scheduled.

After removing L3 and its outbound dependency edges, the resulting graph is shown in FIG. 3C. Any one of the instructions corresponding to nodes L2, L4, or L6 may scheduled. An arbitrary choice of scheduling node L2 first is made. The resulting graph, after removing L2 and any outbound dependency edges (there were none, in this case) is shown in FIG. 3D. Now either of nodes L4 or L6 may be chosen to be scheduled. L6 is chosen and removed, leaving the graph shown in FIG. 3E. The only choice left is L4, which is scheduled and removed, leaving the graph shown in FIG. 3F. The final remaining node, L5, is scheduled next. After removing the node L5, the graph is empty.

The use of the DAG helps in making sure that the instructions are scheduled such that no instructions having dependencies are incorrectly, but what about the situations when there where multiple choices to be made—multiple nodes all with no dependencies and available at the same time? In the above example purely arbitrary choices between available nodes were made.

It has been experimentally determined that a significant boost in processor performance can be realized by adding another step to the use of DAGs for memory operations. Rather than arbitrarily choosing any of the available ready-to-execute nodes from the DAG, the heuristic use of a memory queue is added. The memory queue discipline is that of a FIFO queue. Any time there is a choice of memory operations in the DAG, a memory operation is chosen that will tend to fill the memory queue. This continues until the memory queue has a predefined number of elements, or is full. Given a choice, memory operations are now chosen that will keep the memory queue as nearly full as possible without overfilling.

In target processors, this corresponds to ordering instructions so that the maximum number of outstanding loads, prefetches, or stores are always in the processor's outstanding memory operation queue. This helps maximize the parallelism in the memory system, and minimize or eliminate the processor getting into a stall state. The queue will be sized to model a memory operations queue on a target processor, for example the UltraSPARC III has an outstanding memory operation queue length of 8. Having the memory operation que as full as possible helps to get more memory operations started and running, and thus will maximize cache hits and prevent processor stall.

The actual processor may or may not stall if the queue is filled, depending on the status of the earliest entry. Since the goal is keep the processor from stalling, the target for filling the actual hardware queue will be to keep the queue as close to one less than the maximum number of entries allowed as possible. This same goal is then used in the software queue of the optimizing compiler.

While using memory queue(s) in an optimizing compiler, memory operations are categorized as either adding or subtracting elements from the memory operations queue (or queues—for ease of discussion, one queue will be assumed). Generally loads and prefetches will add a memory operation element to the queue, while operations that rely on a memory operation to complete in order to execute will remove an element or elements from the queue. Stores are more difficult to model because in most cases there is no specific instruction to cause the store to complete and be removed from the memory queue.

It will be appreciated by a person of average skill in this art and with the benefit of the present disclosure that other variations of the heuristic just discussed can either be added or subtracted from the algorithms used in determining how individual instructions should be scheduled. All such variations, as well as other heuristics and choice methods, are anticipated by the present disclosure and are within the inventive nature of using DAGs and queues for optimizing the order of memory operation instructions for a target processor.

Referring now to FIG. 4, a block diagram of a system running the present invention is shown. Computing device 400 has a hardware base 402 and an operating system 404. These two components are of conventional design using well known components and are exemplified by a Sun Microsystems Ultra 60 Workstation running the Solaris 7 operating system. The hardware and operating system must be minimally adaptable and configurable to act as support to run the present invention, such systems typically going under than name of workstations or servers. Any system providing enough system resources will work with the present invention. On top of operating system 404 are various applications, shown as 406, 408, 410, and 412. The arrows indicated by 414 show the parts of the system that are directly interacting with each other. Operating system 404 is continually interacting with hardware 402 as well as each of the applications 406, 308, 410 and 412. The application programs 406, 408, 410, and 412 make use of system services, system resources, and hardware resources through operating system 404.

Application 412 is a compiler program according to the present invention. The application programs 406, 408, and 410 are shown for illustrative purposes only, and may or may not exist in any particular system on which the present invention is installed. They are not required nor are they a part of the present invention; they exist independently of, and may coexist with, the present invention.

Overall, compiler application 412 contains many functional modules including those needed to compile any given source code program into relocatable assembly code. The implementation of a compiler with modules according to the present invention may be implemented in a traditional programming language such as C or C++, or other suitable language. As will be appreciated by one of ordinary skill in the art and with the benefit of the present disclosure, the compiler may be implemented in any number of ways and with considerable variance in overall functionality while still encompassing the inventive nature of the present disclosure.

Continuing on in FIG. 4, compiler program 412 is reading from source files, using interim files, and writing to target files, shown as files 418, 420, and 422. The interactions between compiler program 412 and the files is indicated by communication arrows 428. Other source files, which may be library files or other system resident files, are shown as 424 and 426 and have not yet been called by the compiler. As will be appreciated by those of ordinary skill in the art and with the benefit of the present invention, there may be any number of source, target, and interim files.

The server's main memory is shown as 440. 442 is memory space taken up by the operating system. 444 is the main memory space occupied by the compiler application program according to the present invention. Source files, target files, and interim files are shown as 446, 448, 450, and 452.

Figure 5:
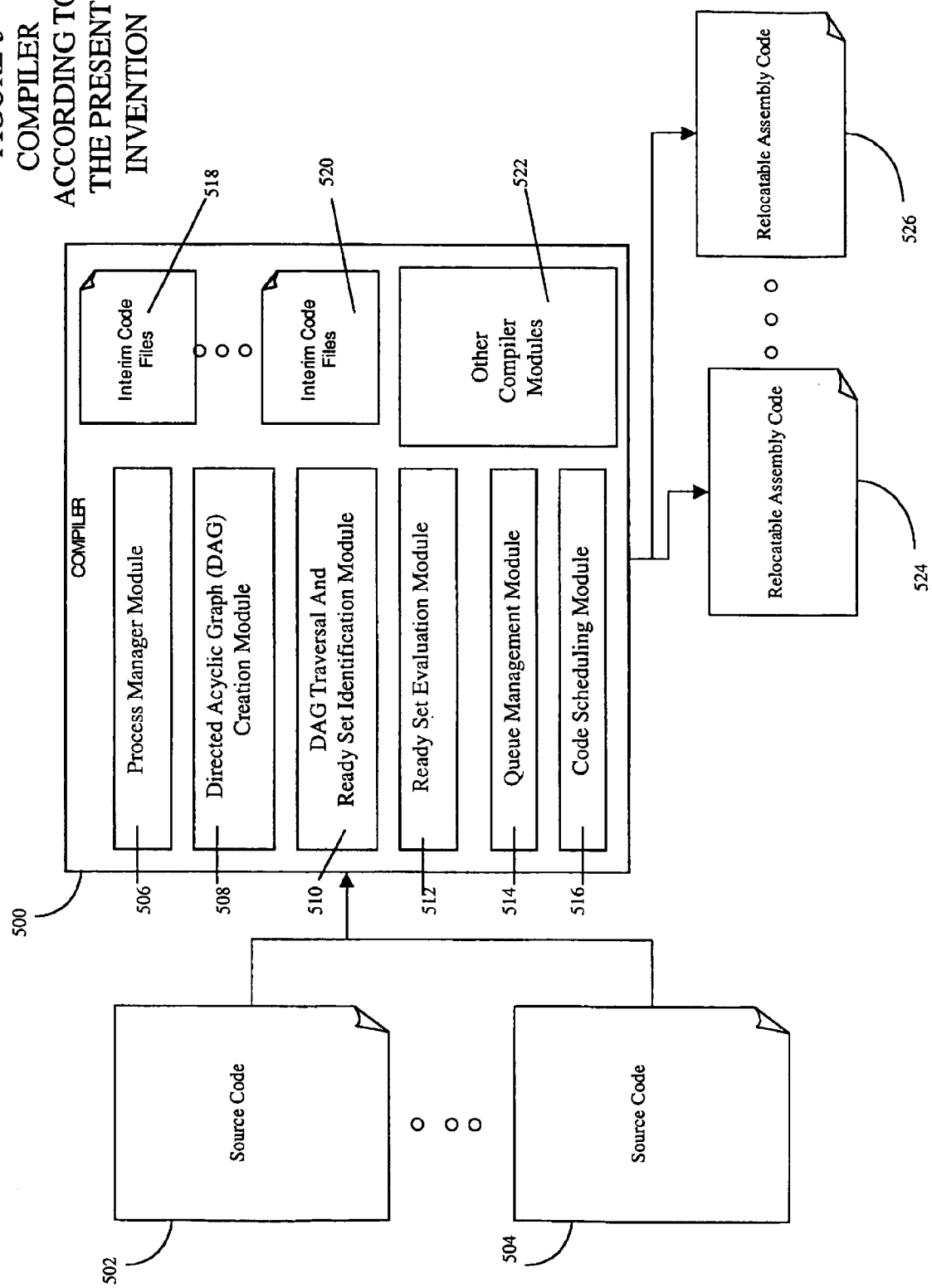
FIG. 5 is a block diagram of a compiler embodying the present invention.

FIG. 5 is a logical block diagram of a compiler program according to the present invention. Compiler 500 reads from source files, shown as 502 and 504. There may be any number of source files, indicated by the ellipses between source file 502 and source file 504. During the compilation process, various interim files are created, shown as files 518 and 520. There can be any number of such files, as shown by the ellipses between files 518 and 520. The overall process is controlled by process manager module 506.

When discussing functional module components implemented in software of the present invention, "module" is used to mean any collection of lines of code found on machine readable media that perform the indicated function. Typically such lines of functionally related code will be organized into a closely associated set of routines, files, functions, and other software engineering elements. However, regardless of how the actual lines of code are physically distributed in the code base that provides the functionality being described, those lines of code comprise the embodiment of the functional blocks. Additionally, some modules may also be implemented in hardware. All such implementations are fully within the inventive concepts of the present disclosure.

After the source files are compiled into assembly code or a similar low level intermediate representation by other components of the compiler (shown generally as functional block 522), the assembly code files are passed by the process manager 506 to DAG creation module 508. While it is expected that process manager module 506 will be used in most implementations, the present invention also fully contemplates implementations without process manager 506. Process manager 506 is an optional module.

After DAG creation module 508 completes the dependency graph, the graph is traversed by DAG traversal and ready set identification module 510. DAGs are traversed in ways well known in the art; in this case, the traversal will be in topological order. Another property of the just created DAG is there will always be at least one node with no dependency arrows entering it. This is true because there will always be the first instruction of the program which, because it is the first, cannot be dependent on any previous instruction. When there are no more nodes in the DAG there will be no more instructions to schedule, so the algorithm ends.

At any given time in the traversal of the DAG there will ordinarily be several, if not many, nodes that have no dependency arrows coming into them. Any of these nodes may be inserted next in the instruction stream (they are all ready to be scheduled or to execute). This group of ready to execute nodes, or instructions, are called the ready set. The ready set always starts with at least one member, and when it becomes empty (meaning there are no more nodes that can be scheduled), the algorithm is over. Nodes are subtracted from the ready set when an node element is chosen to be executed (scheduled, put next in the instruction stream by the optimizer). Nodes are added to the ready set after the DAG traversal module traverses the new graph that is left after a node is removed. When a node is removed, so are any edges originating from it. The DAG traversal module then re-evaluates the remaining graph, detecting any nodes elements that are now ready to be scheduled because of the removal of dependency arrows. The DAG traversal and ready set management duties are all carried out within DAG traversal and ready set identification module 510.

Once the ready set has been updated or established, ready set evaluation module 512 has the task of evaluating the current state of the memory queue with the current members of the ready set. This is explained in more detail below, but briefly, ready set evaluation module 512 checks the memory queue for the number of slots available. Module 512 then picks the best member of the ready set to keep the memory queue as full as possible without stalling the processor.

Queue management module 514 manages the memory queue (or queues). This module adds members, removes members, and responds to requests about current members from other modules.

The results of picking one member of the ready set over another as the DAG graph is traversed is implemented in the target compiled code by code scheduling module 516. When a member of an ready set is chosen by ready set evaluation module 512, the corresponding:instruction line is arranged to be the next executed in the code stream by code scheduling module 516.

The result of the overall compilation process is a relocatable assembly language file or files, shown as files 524 and 526. There may be any number of output files, depending on the input to compiler 500, as is indicated by the ellipses between files 524 and 526.

Figure 6:
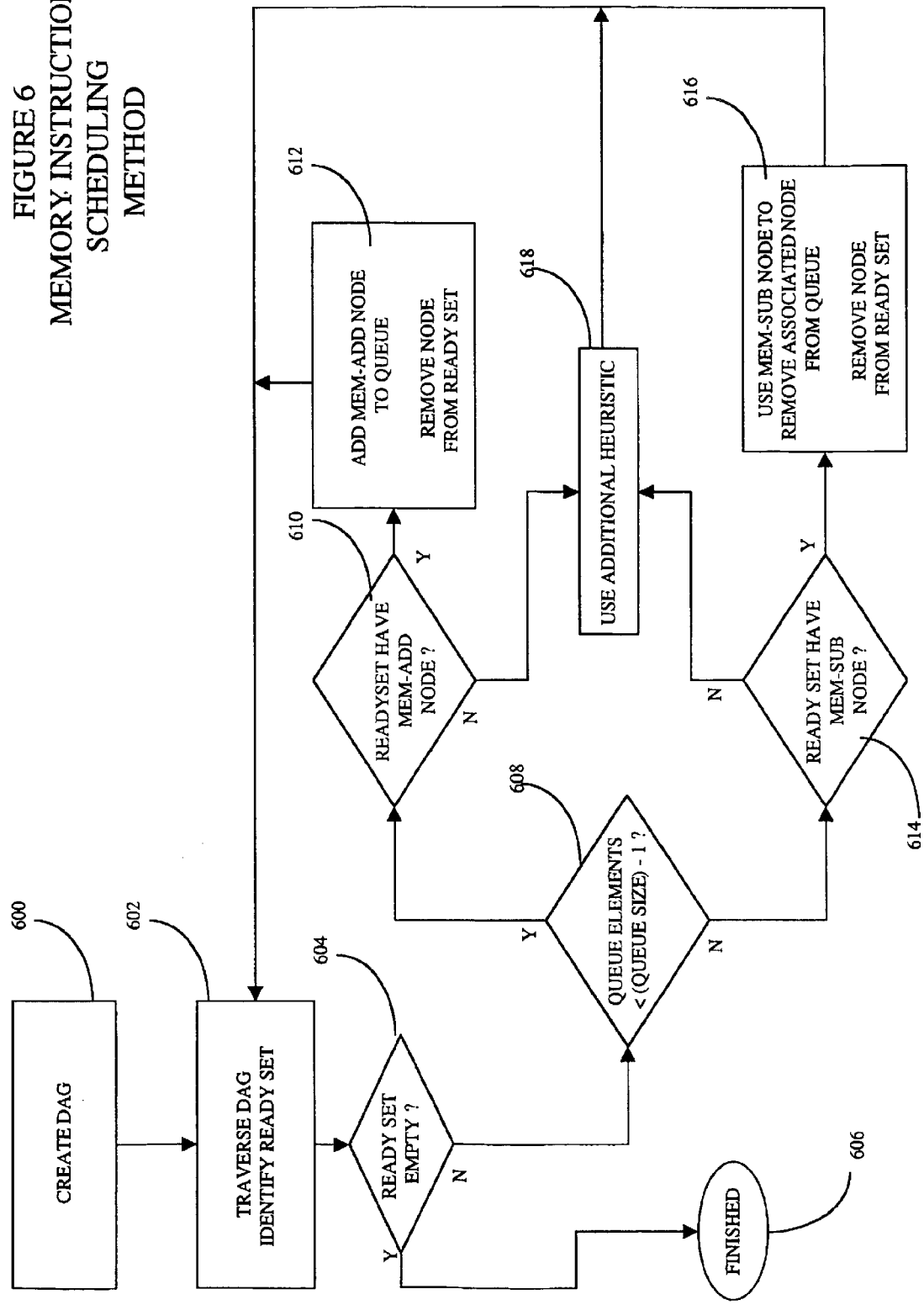
FIG. 6 is a block diagram of a method for the present invention.

Referring now to FIG. 6, a method of using the present invention is shown in block diagram form. For each file or set of files that are compiled, the first step is the creation of a directed acyclic graph that represents the dependencies between instructions (DAG). This action is shown in block 600. After the DAG graph creation step is completed, the process continues to block 602.

There are two related actions carried out in block 602. The DAG is traversed in topological order, visiting the nodes as specified by the ordering. The traversal order and ready or executable node identification methods are those which are well-known in the art; see generally "Introduction To Automata Theory, Languages, And Computation" by Hopcroft and Ullman, as well as the compiler text referenced earlier. Once the graph has been updated, traversed, and the current ready set identified, block 602 is left and diamond 604 entered.

Diamond 604 queries if the ready set is empty. If it is, the "YES" exit is taken to oval 606, the end of the process. If oval 606 is reached all the instruction scheduling for the file or files being compiled has been completed, and this iteration of instruction scheduling is complete. If the ready set is not empty, the "NO" exit is taken to diamond 608.

Diamond 608 evaluates the state of the memory queue. If the memory queue has fewer elements in it than one less than the number which corresponds to execution being blocked in the target processor (the total number of slots, the queue's size, less one), then the "YES" exit is taken to diamond 610.

Diamond 610 determines if there is a memory operation in the ready set that will add an element to the queue, called a mem-add node. The goal is to keep the number of elements in the memory operations queue as close to (queue_size-1) as possible, where queue_size is the size at which pipeline stalls of the actual in-flight memory fetch queue of the target processor will occur. If there is a node of the ready set that can be added to the memory queue, the "YES" exit is taken from diamond 610 and block 612 is entered.

The actions in block 612 involve first removing the chosen node from the ready set, adding the corresponding element to the memory queue (FIFO ordering), scheduling the instruction corresponding to the chosen element in the instruction stream, and removing the chosen node from the DAG (this includes removing any dependency edges originating from that node in the graph).

Looking a bit further at queuing and dequeuing in general, once an element corresponding to a mem-add node has been added to the memory queue, it will be dequeued when the first of its successor nodes is scheduled, and this node is called a mem-sub node. For example in FIG. 3A, when node L1 is scheduled an element is added to the memory queue, then the first of nodes L2 or L4 to be scheduled will be the mem-sub node and remove that element plus any elements further back in the queue. So, at FIG. 3C, when L2 is scheduled, the queue element for L1 is removed, but L3 is not removed, since it was added to the queue (scheduled) after L1.

Returning to box 612, after these actions are completed block 612 is exited and block 602 entered. The process will now continue with block 602, carrying out the DAG traversal and identification of the current ready set.

If, at diamond 610 there was no memory operation in the ready set that can be added to the memory operations queue, then the remainder of the entries in the ready set must be memory operations that remove elements from the memory operations queue. The "NO" exit is taken from diamond 610, and block 618 is entered.

Since there are no memory-add node types available in the ready set, the action taken in block 618 is to choose a next best node. If there are multiple nodes in the ready set, then one may be chosen arbitrarily or other heuristics may be employed. If there are multiple memory queues, they my each be assigned a priority or a weight that can be used to help choose which node should be scheduled first (e.g. adding an element to the highest priority queue would be preferred). The simplest heuristic is to choose the first ready node or to choose an arbitrary node, as in the example of FIGS. 3A–3F. A common heuristic is to choose the highest node from the bottom of the graph. In actual practice, there are several heuristics used in sequence, where a tie in one heuristic leads to the use of the next heuristic, as is well known in the art.

After a node is chosen, the actions taken in block 618 involve first removing the chosen node from the ready set. If the node corresponds to a mem-sub instruction then one or more elements will be removed from a queue. If the chosen node corresponds to an instruction that is neither, no change is made to any memory queue.

If the node corresponded to a mem-sub instruction, the element in the memory queue furthest from the end of the memory queue, and corresponding to node just removed from the ready set (if there is one), is removed from the memory queue along with any elements closer to the end of the queue (if any), in keeping with FIFO ordering.

This corresponds to the idea that if a memory operation has completed for an element of the memory queue that is not the last element of the queue, any previously started memop operations will also have completed. The correspondence between nodes being scheduled and queue elements is that of load to use, a prefetch to memory operation, or load to store. This correspondence is also represented by an edge in the DAG where the memory operation is a successor node. It is also the case that some operations in subroutine calls and cache misses may also drain some of the memory queue elements.

Next, the instruction corresponding to the chosen node is inserted in the instruction stream. Finally, the chosen node is removed from the DAG, including the removal of any dependency edges originating from that node.

After these actions are completed, block 618 is exited and block 602 entered. The process will now continue with block 602, carrying out the DAG traversal and identification of the current ready set.

Returning now to diamond 608, if the number of elements currently in the memory queue is greater than or equal to (queue_size-1), then the "NO" exit is taken to diamond 614. Note that it is entirely possible that the memory queue size may grow larger than (queue_size). This undesirable condition would correspond to the target processor being in a stall state while outstanding memory operations are completed, and is what is being minimized and/or eliminated by the current invention.

Diamond 614 searches for an available node in the ready set that has the effect of removing elements from the memory queue, called a mem-sub node. If there is a mem-sub node in the ready set, then the "YES" exit is taken to block 616.

In block 616 the following actions are carried out: remove the chosen node from the ready set; remove the element corresponding to the chosen node from the memory queue (where "corresponding to" means the predecessor node of the chosen node that was a mem-add for this chosen node), plus any older elements if any; insert the instruction corresponding to the chosen ready set node in the instruction stream; and, remove the node corresponding to the chosen element from the DAG, including the removal of any dependency edges originating from that node in the graph.

After these actions are completed, block 616 is exited and block 602 entered. The process will now continue with block 602, carrying out the DAG traversal and identification of the current ready set.

Finally, if there are no mem-sub memory operations in the E-Set at diamond 614, the "NO" exit is taken out of diamond 614 and block 618 entered. The action taken in block 618 is to choose a next best node from the ready set, given the fact that there are no memory subtract node types available. The same types of heuristics discussed when box 618 was entered earlier apply here, as are well known in the art. After a node is chosen using a heuristic, the actions taken in block 618 are, first, removing the chosen node from the ready set. The element in the memory queue corresponding to node just removed from the ready set (if there is one), is removed from the memory queue along with any elements closer to the end of the queue (if any), in keeping with FIFO ordering. Next, the instruction corresponding to the chosen node is inserted in the instruction stream. Finally, the chosen node is removed from the DAG, including the removal of any dependency edges originating from that node.

After these actions are completed, block 618 is exited and block 602 entered. The process will now continue with block 602, carrying out the DAG traversal and identification of the current ready set.

The method for the present invention has been described primarily in terms of using a single memory queue to model the actual memory queue or queues in a target processor. However, it is fully contemplated that the present invention encompasses any number of queues that may be needed to most efficiently model the behavior of any or all target processors. "Target processor(s)" is being used to mean the processor or processor family on which the compiled code is designed to run. This may or may not be the same as the processor on which the system embodying the present is installed. For many applications the two will definitely be different (i.e., embedded systems development).

In implementations where multiple memory queues are being used rather than a memop single queue, a few modifications to the description of the logical blocks need to be made. In FIG. 5 changes will appear primarily in ready set evaluation module 512 and in the queue management module 514. Queue management module 514 can readily handle any number of independent queues, each with a unique name. One possible implementation would have three queues: a load queue (e.g., fed by load instructions and drained by register usage); a prefetch queue (e.g., fed by prefetch instructions and drained by loads and stores); and, a store queue (e.g., for store instructions). Ready set evaluation module 512 would know about each queue, and would handle memory operations that add and remove memory operations in a way that is in accordance with the effects on the target processor(s). For example, a priority scheme where the prefetch queue has highest priority and the store queue has the lowest priority is part of the implementation. Thus, the present invention fully contemplates the use of one or more memory operation queues (normally expected to be 1 to 3 but expandable as needed), where the number of queues used will depend on the best way of modeling the target processor(s). This also includes implementations where the number of queues in use may be dynamic, that is, dependent on both the target processor(s) and the level of instruction scheduling that is desirable for the program being compiled.

The description of the current invention used, for illustrative purposes, a FIFO queue having a maximum queue size (or number of elements) defined as (queue_size−1). Queue_size is determined by looking at the target processor. This was to help with intuitive understanding of the relationship between the queue used in the present invention and an actual hardware queue found in a target processor. As will be obvious to one of ordinary skill in the art and with the benefit of the present disclosure, other queue disciplines coupled with an indicator for a desired number of outstanding memory operations may be used in the present invention while remaining entirely within the inventive bounds of the present disclosure. Such variations are fully contemplated by the current disclosure.

The present invention has been partially described through the use of a flow chart. As is appreciated by those of ordinary skill in the art and with the benefit of the present disclosure, the procedures described herein may be repeated as continuously, as often, or as little as necessary to satisfy the needs described and details or order of steps may vary without departing from the basic concepts of the present invention.

A system embodying the present invention could run on any computer system having a standard configuration as a development system; it can also be the case that some components of the present invention could be implemented in hardware such as in a hardware scheduler, and such a system would then include those portions in software and hardware. The software portions of the present invention is embodied in various machine readable media on the system, on which are stored programs, data, and data structures. It is contemplated that any media suitable for use with the program and its accompanying data and data structures is within the scope of the present invention. Examples would include memory and other relatively fast-access semiconductor media, as well as magnetic or optical secondary storage media.

While embodiments and applications of this invention have been shown and described, it will be apparent to those or ordinary skill in the art and with the benefit of the present disclosure that many more modifications than mentioned above are possible without departing from the inventive concepts contained herein. The invention, therefore, is not to be restricted except in the spirit of the associated claims.

What is claimed is:

1. In a scheduler having at least one target processor, a method for ordering instructions in a code file having a plurality of instructions, the method comprising:
   (a) determining dependencies between instructions in said plurality of instructions;
   (b) creating a directed acyclic graph showing said dependencies in said plurality of instructions, where said directed acyclic graph's nodes each correspond to an instruction from said plurality of instructions;
   (c) identifying one or more queues, including a first queue;
   (d) traversing said directed acyclic graph in a dependency-preserving manner;
   (e) creating a ready set of nodes comprising nodes in said directed acyclic graph having corresponding instructions in a ready state;
   (f) finishing if there are no nodes having corresponding instructions in a ready state;
   (g) identifying a threshold level in said first queue, said threshold corresponding to a maximum desirable fullness of said first queue;

(h) if said first queue is less full than said threshold, choosing a node in said ready set that corresponds to an instruction that would increase the fullness of said queue, if any such node exists in said ready set;

(i) if said first queue is at least as full as said threshold, choosing a node in said ready set that corresponds to an instruction that would decrease the fullness of said queue, if any such node exists in said ready set;

(j) if no node is chosen in (h) or (i), heuristically choosing a node in said ready set;

(k) removing said chosen node from said directed acyclic graph;

(l) modifying said first queue in accordance with said chosen node and its corresponding instruction;

(m) modifying the order of instructions in said code file in accordance with said chosen node and its corresponding instruction; and (n) continuing processing at (d).

2. The scheduler of claim 1, wherein:
said first queue is configured to facilitate scheduling of the instructions;
said node chosen in (h) corresponds to an instruction that will add an element to said first queue; and
said node chosen in (i) corresponds to an instruction that will remove at least one element from said first queue.

3. The scheduler of claim 1, wherein said (c) comprises identifying a load queue, a prefetch queue and a store queue, the method further comprising:
(aa) determining and correlating a maximum desirable number of elements for each of said load queue, said prefetch queue, and said store queue; and
(bb) determining a precedence ordering between said load queue, said prefetch queue, and said store queue.

4. The scheduler of claim 1, wherein:
said (c) comprises:
(c1) determining a number of queues to use in accordance with a target processor;
(c2) determining a maximum desirable fullness for each of said determined number of queues; and
(c3) determining a precedence ordering between each of said determined number of queues; and
each of said (h) and said (i) comprises:
(hi1) choosing one of said nodes in said ready set that will change the number of elements in one of said determined number of queues, in accordance with said precedence order and said maximum desirable fullness, if one of said nodes can be found; and
(hi2) choosing one of said nodes in said ready set that will not change the number of elements in one of said determined number of queues, in accordance with said precedence order and said maximum desirable fullness, if none of said nodes in said ready set can be found that will change the number of elements in one of said determined number of queues.

5. The scheduler of claim 1, where said ordering of said instructions in said code file uses a hardware scheduler in accordance with said chosen node and its corresponding instruction.

6. The scheduler of claim 1, wherein said (l) comprises:
(aa) adding an element corresponding to said chosen node to said first queue if said first queue is less full than said threshold; and
(bb) removing at least one element in accordance with said chosen node from said first queue if said first queue is at least as full as said threshold.

7. A program storage device readable by a machine, tangibly embodying a program of instructions executable by the machine to perform a method for ordering instructions in a code file having a plurality of instructions, the method comprising:

(a) determining dependencies between instructions in said plurality of instructions;

(b) creating a directed acyclic graph showing said dependencies in said plurality of instructions, where said directed acyclic graph's nodes each correspond to an instruction from said plurality of instructions;

(c) identifying one or more queues, including a first queue;

(d) traversing said directed acyclic graph in a dependency-preserving manner;

(e) creating a ready set of nodes comprising nodes in said directed acyclic graph having corresponding instructions in a ready state;

(f) finishing if there are no nodes having corresponding instructions in a ready state;

(g) identifying a threshold level in said first queue, said threshold corresponding to a maximum desirable fullness of said first queue;

(h) if said first queue is less full than said threshold, choosing a node in said ready set that corresponds to an instruction that would increase the fullness of said queue, if any such node exists in said ready set;

(i) if said first queue is at least as full as said threshold, choosing a node in said ready set that corresponds to an instruction that would decrease the fullness of said queue, if any such node exists in said ready set;

(j) if no node is chosen in (h) or (i), heuristically choosing a node in said ready set;

(k) removing said chosen node from said directed acyclic graph;

(l) modifying said first queue in accordance with said chosen node and its corresponding instruction;

(m) modifying the order of instructions in said code file in accordance with said chosen node and its corresponding instruction; and (n) continuing processing at (d).

8. The program storage device of claim 7, wherein:
said first queue is configured to facilitate scheduling of the instructions;
said node chosen in (h) corresponds to an instruction that will add an element to said first queue; and
said node chosen in (i) corresponds to an instruction that will remove at least one element from said first queue.

9. The program storage device of claim 7, wherein said (c) comprises identifying a load queue, a prefetch queue and a store queue, the method further comprising:
(aa) determining and correlating a maximum desirable number of elements for each of said load queue, said prefetch queue, and said store queue; and
(bb) determining a precedence ordering between said load queue, said prefetch queue, and said store queue.

10. The program storage device of claim 7, wherein:
said (c) comprises:
(c1) determining a number of queues to use in accordance with a target processor;
(c2) determining a maximum desirable fullness for each of said determined number of queues; and
(c3) determining a precedence ordering between each of said determined number of queues; and each of said (h) and said (i) comprises:
- (hi1) choosing one of said nodes in said ready set that will change the number of elements in one of said determined number of queues, in accordance with said precedence order and said maximum desirable fullness, if one of said nodes can be found; and
- (hi2) choosing one of said nodes in said ready set that will not change the number of elements in one of said determined number of queues, in accordance with said precedence order and said maximum desirable fullness, if none of said nodes in said ready set can be found that will change the number of elements in one of said determined number of queues.

11. The program storage device of claim 7, where said ordering of said instructions in said code file uses a hardware scheduler in accordance with said chosen node and its corresponding instruction.

12. The program storage device of claim 7, wherein said (l) comprises:
- (aa) adding an element corresponding to said chosen node to said first queue if said first queue is less fill than said threshold; and
- (bb) removing at least one element in accordance with said chosen node from said first queue if said first queue is at least as full as said threshold.

13. A queue modeling instruction scheduler apparatus for use in compiling a program, the apparatus executable in a device having a processor operatively coupled to a memory, the apparatus comprising:
- (a) a directed acyclic graph creation module configured to:
  - (a1) determine dependencies between instructions in a program to be compiled; and
  - (a2) create a directed acyclic graph showing said dependencies in said program, wherein said directed acyclic graph's nodes correspond to instructions in said program;
- (b) a directed acyclic graph traversal and ready set identification module configured to:
  - (b1) traverse said directed acyclic graph in a dependency-preserving manner; and
  - (b2) create a ready set of nodes;
- (c) a ready set evaluation module configured to:
  - (c1) identify which nodes in said ready set correspond to which instructions in said program; and
  - (c2) evaluate said instructions for their effect on memory operations;
- (d) a queue management module configured to:
  - (d1) manage at least one queue, wherein managing a queue comprises adding and removing elements from said at least one queue, and wherein said elements correspond to nodes from said directed acyclic graph; and
- (e) a code scheduling module operably connected to said program, said directed acyclic graph traversal and ready set identification module, said ready set evaluation module, said queue management module and said directed acyclic graph, wherein said code scheduling module is configured to:
  - (e1) add and remove nodes to and from said directed acyclic graph;
  - (e2) determine and correlate a maximum desirable number of elements identifier for said at least one queue;
  - (e3) choose one of said nodes in said ready set that will change the number of elements in said at least one queue in accordance with said correlated identifier;
  - (e4) have elements of said at least one queue added and removed; and
  - (e5) change the order of instructions in said program in accordance with said instructions, said nodes, and said at least one queue.

14. The apparatus of claim 13, wherein said at least one queue comprises a load queue, a prefetch queue and a store queue, and wherein said code scheduling module is further configured to:
- (e5) determine and correlate a maximum desirable number of elements identifier for each of said load queue, said prefetch queue, and said store queue;
- (e6) determine a precedence ordering between said load queue, said prefetch queue, and said store queue; and
- (e7) choose one of said nodes in said ready set that will change the number of elements in one of said load queue, said prefetch queue, or said store queue in accordance with said precedence order and one of said correlated identifiers.

15. The apparatus of claim 13, wherein:
said queue management module is further configured to:
- (d2) determine a number of queues to use in accordance with a target processor; and
- (d3) manage said determined number of queues; and
said code scheduling module is further configured to:
- (e5) determine a precedence ordering between each of said determined number of queues; and
- (e6) choose one of said nodes in said ready set that will affect the elements in one of said determined number of queues in accordance with said precedence order.

16. The apparatus of claim 13, wherein said code scheduler module comprises a hardware scheduler.

17. A method of scheduling a set of instructions during compilation of a program comprising the instructions, the method comprising:
- (a) constructing a directed acyclic graph depicting dependencies among instructions in the set of instructions, wherein each node in the graph corresponds to an instruction in the set of instructions;
- (b) identifying a ready set of nodes representing instructions having no dependencies on other instructions;
- (c) identifying a target level of fullness within a queue configured to facilitate reordering of the set of instructions;
- (d) if the queue is less full than said target level:
  - (d1) selecting a node in said ready set that corresponds to an instruction that would generate a memory operation; and
  - (d2) if said ready set includes no such node, heuristically selecting a node in said ready set;
- (e) if the queue is at least as full as said target level:
  - (e1) selecting a node in said ready set that corresponds to an instruction that requires completion of a previous memory operation; and
  - (e2) if said ready set includes no such node, heuristically selecting a node in said ready set;
- (f) removing the selected node from the ready set and the graph; and
- (g) scheduling the instruction corresponding to the selected node.

18. The method of claim 17, wherein:
said instruction that would generate a memory operation comprises one of: a load, a prefetch and a store; and
said instruction that requires completion of a previous memory operation is an instruction dependent upon one or more of: a load, a prefetch and a store.

* * * * *